(12) United States Patent
Tan (10) Patent No.: US 6,785,326 B1
(45) Date of Patent: Aug. 31, 2004

(54) METHOD AND APPARATUS FOR DETECTING AND COMPENSATING DIGITAL LOSSES IN A COMMUNICATIONS NETWORK

(75) Inventor: Lijun Daniel Tan, Mississauga (CA)

(73) Assignee: Freescale Semiconductor, Inc., Austin, TX (US)

( * ) Notice: Subject to any disclaimer, the term of this patent is extended or adjusted under 35 U.S.C. 154(b) by 787 days.

(21) Appl. No.: 09/632,890

(22) Filed: Aug. 7, 2000

(51) Int. Cl.[7] .............................. H04B 1/38; H04L 5/16
(52) U.S. Cl. ........................ 375/222; 370/522; 379/414
(58) Field of Search ................................ 375/222, 231, 375/350, 346; 370/523, 522; 379/414, 93.01

(56) References Cited

U.S. PATENT DOCUMENTS

| | | | |
|---|---|---|---|
| 5,394,437 A | | 2/1995 | Ayanoglu |
| 5,825,823 A | | 10/1998 | Goldstein |
| 6,185,249 B1 | * | 2/2001 | Drucker et al. ............. 375/222 |
| 6,301,296 B1 | * | 10/2001 | Krishnan et al. ........... 375/222 |
| 6,512,787 B1 | * | 1/2003 | Tung et al. ................. 375/222 |

FOREIGN PATENT DOCUMENTS

| | | |
|---|---|---|
| EP | 0871303 A2 | 10/1996 |
| EP | 0977410 A1 | 2/2000 |
| WO | WO 00/27058 | 5/2000 |
| WO | WO 00/45524 | 8/2000 |
| WO | WO 00/45534 | 8/2000 |

OTHER PUBLICATIONS

PCT/US01/24064 International Search Report.

* cited by examiner

*Primary Examiner*—Amanda T. Le (57) ABSTRACT

The present invention relates generally to impairment detection and compensation in a communications network. One embodiment includes a method for generating an adaptive Digital Impairment Learning (DIL) sequence for use in a training mode which assists in resolving digital loss ambiguities affecting the mapping of analog levels to digital levels in a communications network. The method includes identifying a feature octet for a pair of the digital loss ambiguities, determining a number of transmit copies of the feature octet based at least in part upon a noise variance, and modifying a standard DIL sequence with the number of transmit copies of the feature octet to produce the adaptive DIL sequence for use in the training mode. Alternate embodiments relate to an apparatus for generating an adaptive DIL sequence for use in a training mode and an apparatus and method for compensating for digital losses in a communications network.

30 Claims, 9 Drawing Sheets

METHOD AND APPARATUS FOR DETECTING AND COMPENSATING DIGITAL LOSSES IN A COMMUNICATIONS NETWORK

FIELD OF THE INVENTION

The present invention generally relates to impairment detection and compensation in a communications network, and more particularly to a method and apparatus for detecting and compensating digital losses in a communications network.

BACKGROUND OF THE INVENTION

A modem converts binary data into modulated analog signals, which are typically transmitted over facilities originally designed for voice transmissions, such as the public switched telephone network (PSTN). Conventional modems treat the PSTN as a pure analog channel even though the signals are in digital form during most of transmission, while pulse code modulation (PCM) modems take advantage of the fact that most of the network is digital and central site modems (e.g., internet service providers and on-line services) are connected to the PSTN via digital connections (e.g., a North American T1 or a European E1 digital connection).

Central site PCM modems transmit eight bit digital words, also referred to as octets or points, corresponding to different coder-decoder (CODEC) output levels. At a central office or digital loop carrier (DLC), the octets are converted to analog levels and transmitted over an analog loop to an end user modem, which maps the equalized digital levels to the originally transmitted octets. However, due to digital impairment in the digital network, including digital loss (DL) and/or robbed bit signaling (RBS), the octets may be corrupted during transmission. This corruption generally results in the generation of a modified level at the central office or DLC, which is received and processed by the end user modem, resulting in a mapping that may not accurately produce the equalized digital levels corresponding to the octets originally transmitted by the central site modem.

In order to mitigate the adverse affects of impairments introduced in the digital network, the impairments are identified during modem training modes. Generally, modem-training modes involve transmission of a training point sequence or Digital Impairment Learning (DIL) sequence between the central site modem and the end user modem, which is analyzed by the end user modem to detect the impairments or combinations of impairments in the communications network. These impairments or combinations of impairments identified by the end user modem are subsequently used to compensate for the digital impairments introduced during transmission. Therefore, methods and apparatus are desirable for detection and compensation of impairments introduced by the digital network of a communications network.

BRIEF DESCRIPTION OF THE DRAWINGS

The present invention will hereinafter be described in conjunction with the appended drawing figures, wherein like numerals denote like elements, and.

DETAILED DESCRIPTION OF A PREFERRED EXEMPLARY EMBODIMENT

Figure 1:
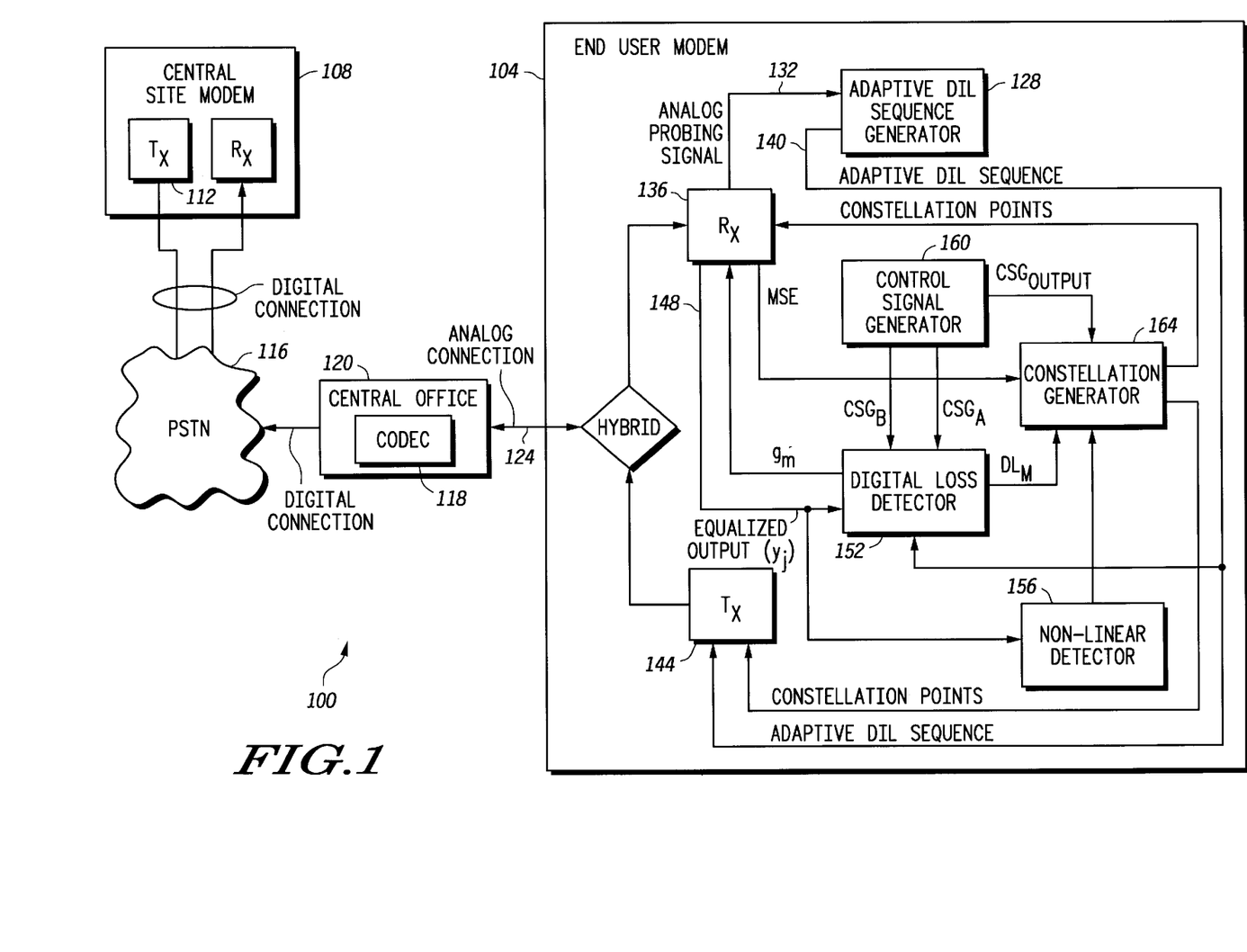
FIG. 1 is a communications network having an end user modem according to a preferred exemplary embodiment of the present invention.

FIG. 1 illustrates a communications network 100 having an end user modem 104 configured in accordance with a preferred exemplary embodiment of the present invention. The communications network 100 includes a central site modem 108 having a transmitter ($T_x$) 112 that is configured to transmit eight bit digital words or octets over the Public Switched Telephone Network (PSTN) 116. The octets sent by the transmitter 112 are converted by a coder-decoder 118 (CODEC) to analog levels in a central office 120 associated with the end user modem 104 according to an octet-coding scheme, such as A-law or $\mu$-law coding. The analog levels converted by the CODEC 118 are transmitted over an analog loop 124 to the end user modem 104, which maps the analog levels to equalized digital levels. The end user modem 104 is configured to generate an adaptive Digital Impairment Learning (DIL) sequence using a noise variance obtained during an analog line-probing phase. This DIL sequence is subsequently used in a training mode to resolve digital loss ambiguities that adversely affect the mapping of the analog levels to the equalized digital levels.

The digital loss ambiguities generally arise between an x-dB loss and (x+Amb_d)-dB loss pair, where the ambiguity offset (Amb_d) is a predetermined constant greater than zero and the ambiguity base (x) is greater than zero and less than the ambiguity offset. The x-dB loss and (x+Amb_d)-dB loss pair give rise to ambiguity in that the end user modem is occasionally unable to distinguish between the two values. Varying the ambiguity offset (Amb_d) results in a different set of digital loss ambiguities, and for each set of digital loss ambiguities there exists at least one octet, which can be used to resolve the ambiguity. Such an octet is referred to herein as a feature octet. For example, in a communications network that uses an A-law coding scheme, there exists a set of digital loss ambiguities for an ambiguity offset of 6.02 dB, which the feature octet is an octet from the second code segment, and preferably the thirty-first octet from the second code segment (i.e., UCODE 31).

In order to resolve ambiguity between a digital loss pair, the end user modem 104 identifies a feature octet for each set of digital loss ambiguities. After the feature octet is found for a digital loss pair, an adaptive DIL sequence is generated with a number of transmit copies of the feature octet sufficient to tolerate channel noise, and preferably adaptive with noise variances. An adaptive DIL sequence generator 128 of the end user modem 104 identifies the feature octet and the adaptive DIL sequence 140 is generated with the feature octet using an analog-probing signal 132 received from the analog loop 124. The adaptive DIL sequence 140 is presented to the transmitter 144 of the end user modem 104 for transmission to the central site modem 108. Once the central site modem 108 receives the adaptive DIL sequence 140, octets defined by the adaptive DIL sequence 140 are subsequently transmitted by the central site modem 108 to the end user modem 104 during a modem training or DIL process.

Figure 2:
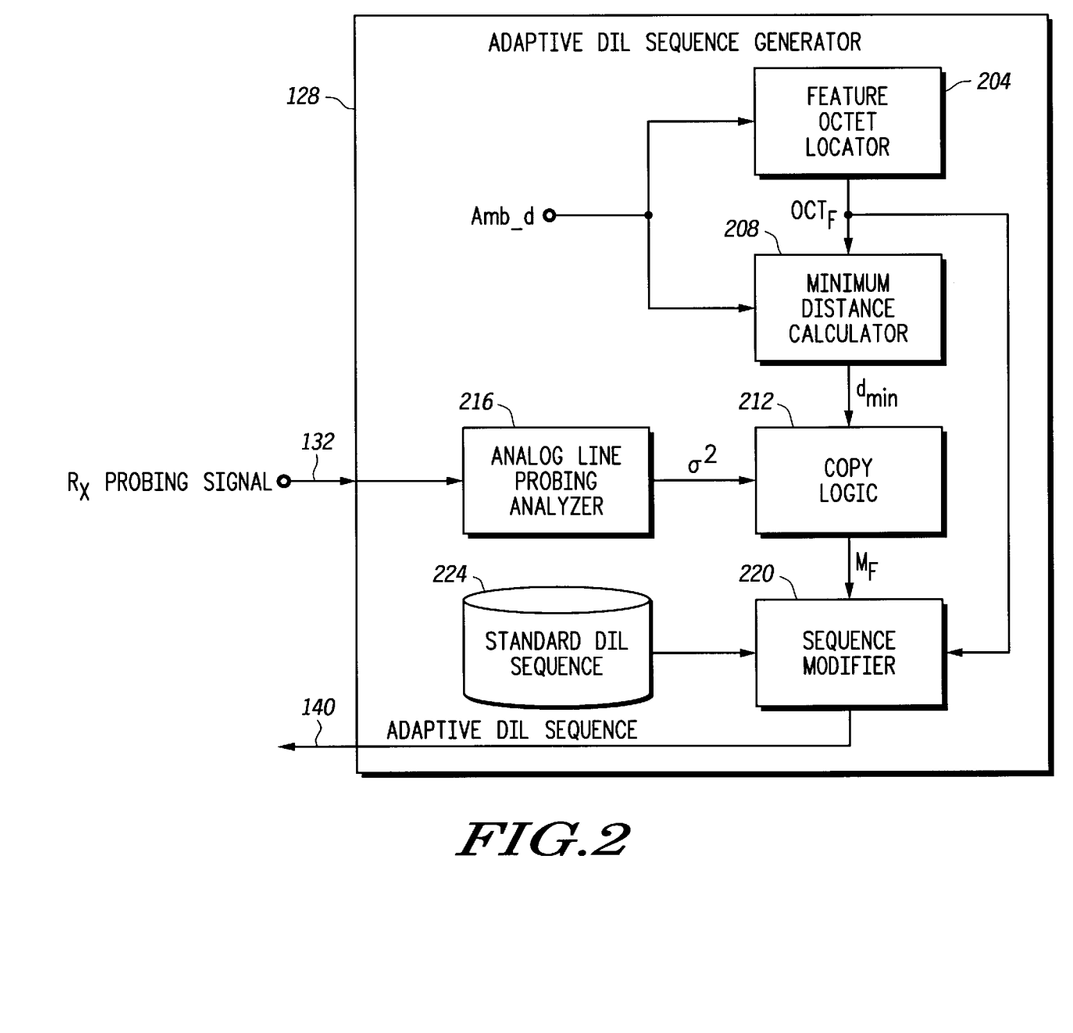
FIG. 2 is the adaptive digital impairment learning (DIL) sequence generator of FIG. 1 according to a preferred exemplary embodiment of the present invention.
Figure 3:
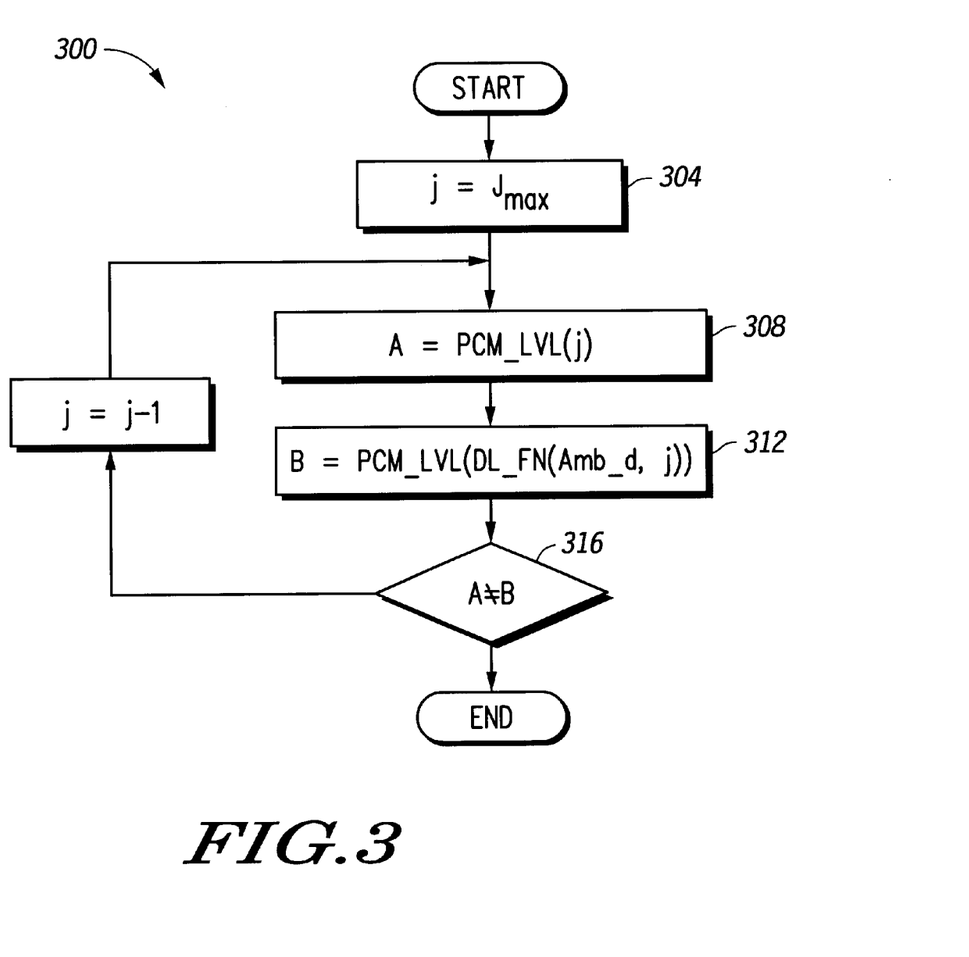
FIG. 3 is a flow-chart of a feature octet searching routine performed by the feature octet locator of FIG. 2 according to a preferred exemplary embodiment of the present invention.

Referring to FIG. 2, the adaptive DIL sequence generator 128 of FIG. 1 is shown in greater detail. Generally, the adaptive DIL sequence generator 128 identifies the feature octet ($OCT_f$) using a priori-knowledge of the digital loss ambiguities, determines the number of transmit copies ($M_f$) of the feature octet and modifies a basic DIL sequence with the number of transmit copies of the feature octet in order to produce the adaptive DIL sequence. The feature octet is identified by a feature octet locator 204, which receives the ambiguity offset (Amb_d) and performs a feature octet searching routine with this value, an example of which is illustrated in FIG. 3. Preferably, the feature octet searching routine is configured to identify a feature octet with a significant power level, and preferably the strongest power level in a particular set of feature octets. For example, given an ambiguity offset of 6.02 dB and an A-law coding scheme, the thirty-first octet from the second code segment (i.e., UCODE 31) would be the preferred feature octet as the thirty-first octet from the second code segment possess the preferred distance properties (i.e., the distance between UCODE 31 and UCODE 30 is 2 and the distance between UCODE 31 and UCODE 32 is 3.

Referring to FIG. 3, the feature octet searching routine 300 begins with an initializing of an index (j). The index is preferably initialized to an octet UCODE ($J_{max}$) 304, and most preferably initialized to an octet UCODE value that is less than one hundred and twenty eight (128) as the transmit power of this point will remain within an preferred range. After the initialization of the index 304, the routine 300 calculates an analog-attenuated value (A) 308 and calculates a digital-attenuated value 312 based on the same amount of loss using the following equations:

$$A = PCM\_LVL(j) * 10^{(-Amb\_d/20)} \quad (1)$$

$$B = PCM\_LVL(DL\_FUN(Amb\_d,j)) \quad (2)$$

Where PCM_LVL(i) is the coding level obtained by performing a D-to-A operation in a communications network line card given an input octet (i), and DL_FUN(x,y) is the digital loss function for mapping an input octet(y) to an output octet (z) with a digital loss of x dB. Once the analog-attenuated value and digital-attenuated value are obtained using equation (1) and equation (2), respectively, a comparison operation 316 is performed with these two values. If the analog-attenuated value is equal to the digital-attenuated value, the feature octet has not been located by the routine 300 and the index is decremented 320 a second analog-attenuated value is calculated 308, a second digital-attenuated value is calculated, and the comparison operation 316 is conducted by the routine 300 until unequal attenuated values are found (i.e., A≠B). As an example, the thirty-first octet from the second code segment (i.e., UCODE 31) is identified as the feature octet using this routine.

Referring to FIG. 2, once the feature octet locator 204 determines the feature, octet, the feature octet is provided to a minimum distance calculator 208. The minimum distance calculator 208 uses the feature octet identified by the feature octet locator 204 and the ambiguity offset (Amb_d) to determine a minimum distance between coding levels ($d_{min}$). The minimum distance calculator 208 performs the following operation in order to determine the minimum distance ($d_{min}$):

$$d_{min} = \min(PCM\_LVL(DL\_FUN(2*Amb\_d,OCT_f-1)) - \quad (3)$$

PCM_LVL(DL_FUN(2*Amb_d,$OCT_f$−1)),
PCM_LVL(DL_FUN(2*Amb_d,$OCT_f$+1))−
PCM_LVL(2*Amb_d,DL_FUN($OCT_f$)))

Where PCM_LVL and DL_FUN are the functions previously described with reference to equation (1) and equation (2). This minimum distance ($d_{min}$) is provided by the minimum distance calculator 208 to copy logic 212 for selection of the number of transmit copies ($M_f$) that improve the reliability of digital loss detection.

In addition to the minimum distance ($d_{min}$), the copy logic 212 also receives a noise variance ($\sigma^2$) obtained during a first phase of a modem startup operation commonly referred to as the analog line-probing phase. An analog line probing analyzer 216, using one of many techniques that are known in the art, produces the noise variance. For example, the noise variance may be generated using the methods and apparatus described in U.S. Pat. No. 5,048,054, titled "Line Probing Modem," and issued on Sep. 10, 1991 to Eyuboglu et al., which is hereby incorporated by reference. Once the noise variance is available from the analog line probing analyzer 216 and the minimum distance has been received from the minimum distance calculator 208, the copy logic 212 is configured to determine the number of transmit copies that provides reliable digital loss detection.

Figure 5:
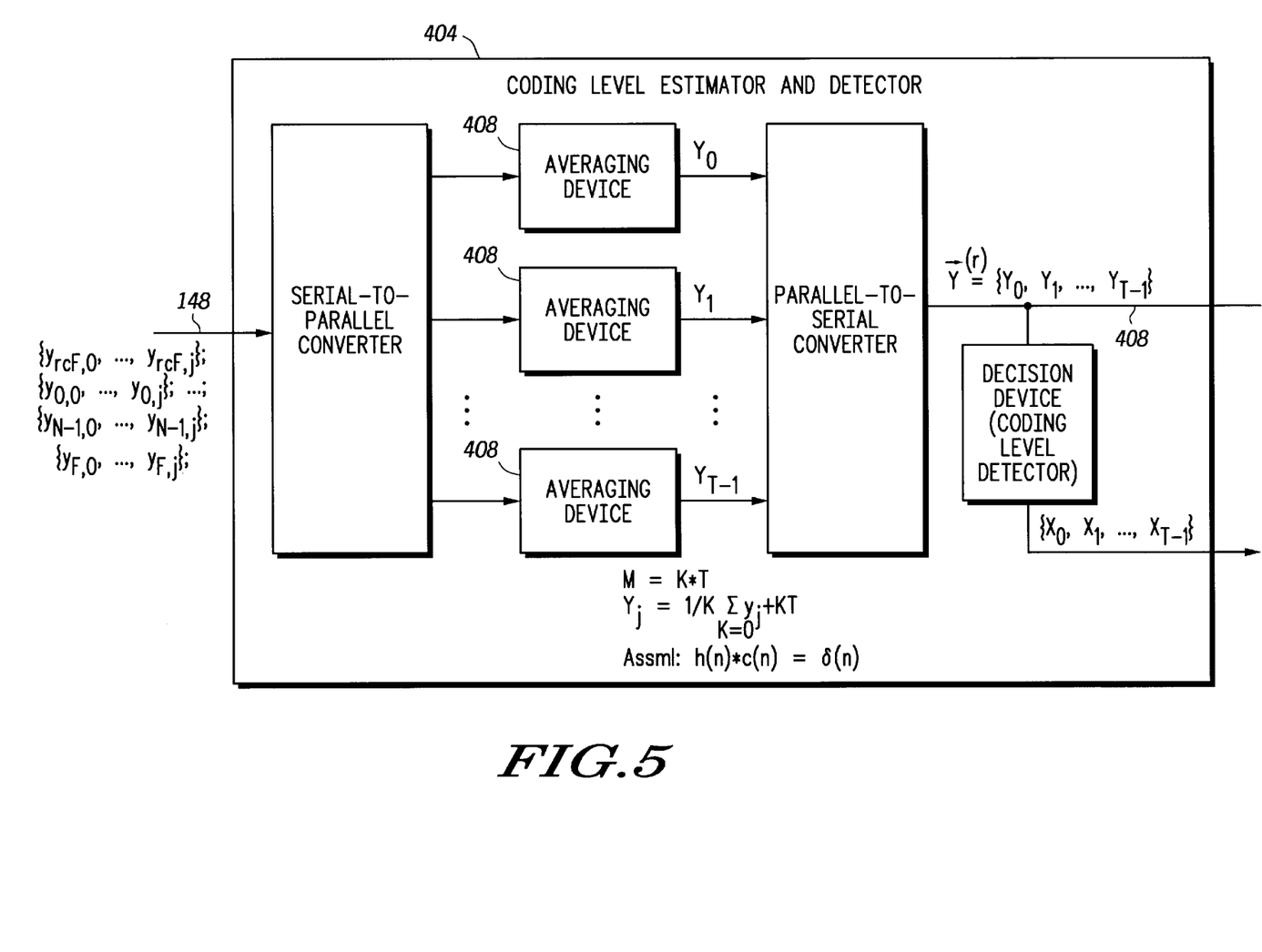
FIG. 5 is the coding-level estimator and detector of FIG. 4 according to a preferred exemplary embodiment of the present invention.

The copy logic 212 selects the number of transmit copies based upon a number of factors that include the error performance (Pe) of a coding-level estimator and detector utilized by the end user modem. Any type of coding-level detector may be utilized in the present invention without departing from the scope and spirit expressed in this detailed description, including the coding-level estimator and detector 404 shown in FIG. 5, the error performance of which can be expressed as:

$$Pe \leq 2 * Q\left(\frac{d_{min}\sqrt{Mf}}{2\sigma}\right) \quad (4)$$

Where $M_f$ is the number of transmit copies of the octet used to generate the error performance and Q(x) is the Gaussian error function:

$$Q(x) = \left(1/\sqrt{2\pi}\right)\int_x^\infty \exp(-x^2/2)dx \quad (5)$$

For reliable coding-level detection, it has been found that an error performance of 0.001 or less is preferable (i.e., Pe<=0.001), however the value may be varied as desired for a particular application. For an error performance of 0.001, the inequality of equation (4) is solved as follows:

$$P_e \leq 2 * Q\left(\frac{d_{min}\sqrt{Mf}}{2\sigma}\right) \leq 0.001 \quad (6)$$

The result of which is:

$$M_f \geq 43.34 * (\sigma^2/d_{min}) \quad (7)$$

Using the relationship of equation (7), the copy logic 212 selects the number of transmit copies ($M_f$) that satisfies the inequality. This value of $M_f$ is then presented to the sequence modifier 220 for generation of the adaptive DIL sequence.

The sequence modifier 220 produces the adaptive DIL sequence by modifying a standard DIL sequence 224 that is preferably designed to provide some general impairment detection. The design of the standard DIL sequence 224 may be any number of DIL sequence designs, including the standard DIL sequence descriptor shown in Table 1 of Appendix A, for example. (See, the DIL descriptor and related discussions presented in "A DIGITAL MODEM AND ANALOGUE MODEM PAIR FOR USE ON THE PUBLIC SWITCHED TELEPHONE NETWORK (PSTN) AT DATA SIGNALLING RATES OF UP TO 56 000 BIT/S DOWNSTREAM AND UP TO 33 600 BIT/S UPSTREAM," Telecommunication Standardization Sector of ITU, September 1998, which is hereby incorporated by reference). The sequence modifier 220 receives the standard DIL sequence 224 and inserts the number of transmit copies of the feature octet provided by the feature octet locator 204. The adaptive DIL sequence is the result of this insertion process, which has a design that assists in resolving digital loss ambiguity. For example, an adaptive DIL sequence is available with this process that substantially resolves the ambiguity of digital losses in an A-law coding scheme for an ambiguity offset of 6.02 when the noise variance is about 50.482 (i.e., the signal-to-noise ratio is about equal to 37 dB given a nominal transmit signal power of −12 dBm). This adaptive DIL sequence, adapted from the standard DIL sequence descriptor shown in Table 1 of Appendix A, is shown in Table 2 of Appendix A. The adaptive DIL sequence of Table 2 has 3072 copies for the feature octet of 31.

Referring to FIG. 1, after the central site modem 108 receives the adaptive DIL sequence 140 from the end user modem 104, octets comprising the adaptive DIL sequence are transmitted by the central site modem 108 through the PSTN 116 and analog loop 120. The receiver ($R_x$) 136 of the end user modem 104 receives the octets comprising the adaptive DIL sequence as an analog signal and passes the signal through an equalizer, which compensates for both amplitude and delay distortion introduced by the digital connections and analog loop. The equalized output 148 of the receiver 136 is an up-scaled estimate of the adaptive DIL sequence as presented to the analog loop 124, and may be mathematically expressed as:

$$y_j = g_m * x_j + w_j \quad (8)$$

Where $y_j$ is the equalizer output 148, $x_j$ is the coding level at the line card output, $w_j$ is the additive white Gaussian noise with noise variance ($\sigma^2$), and $g_m$ is a scaling factor related to the digital loss in the digital network and identified by the digital loss detector as subsequently discussed with reference to FIG. 4. This equalized output 148 is provided to a digital loss detector 152 and non-linear detector 156 for digital loss and non-linear detection, respectively.

Figure 4:
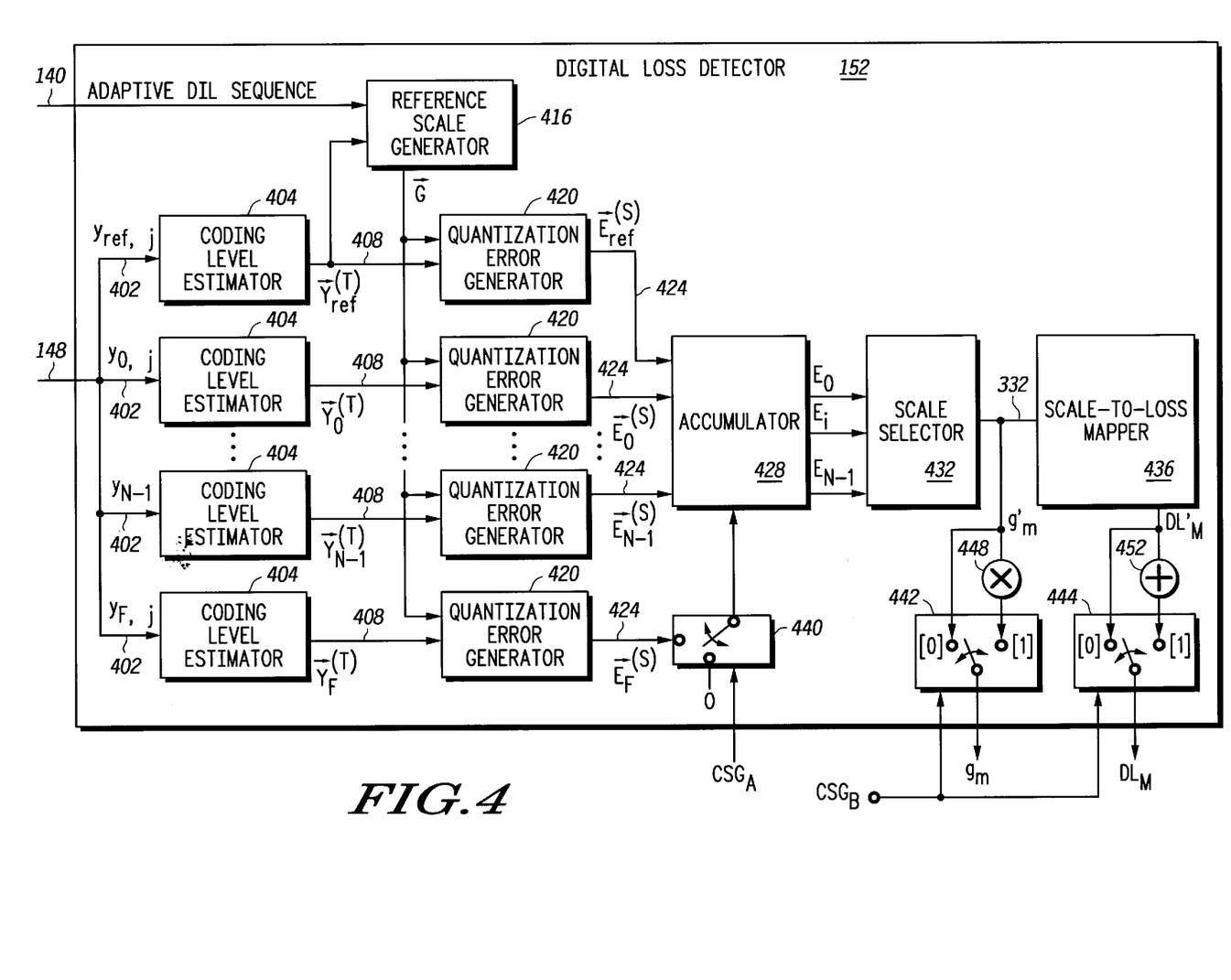
FIG. 4 is the digital loss detector of FIG. 1 according to a preferred exemplary embodiment of the present invention.

Referring to FIG. 4, the digital loss detector 152 of FIG. 1 is shown receiving the equalized output ($y_{ref,0}, \ldots y_{ref,j}, \ldots; y_{1,0}, \ldots, y_{1,j}, \ldots; y_{2,0}, \ldots, y_{2,j}, \ldots; \ldots; y_{N-1,0}, \ldots y_{N-1,j}, \ldots; y_{f,0}, \ldots y_{f,j}, \ldots$) 148 and processing N octets, a reference octet ($OCT_{ref}$) and a feature octet ($OCT_f$). In other words, the digital loss detector 152 is processing N+2 octets. While the digital loss detector 152 preferably processes the N+2 octets sequentially, a parallel operation is illustrated to maintain clarity and simplicity in this detailed description. Once the digital loss detector 152 has received the equalized output 148, the outputs associated with each of the N+2 octets 402 are presented to coding-level estimator and detectors 404, which perform an averaging operation. An example of a coding-level estimator and detector 404 is shown in FIG. 5.

Referring to FIG. 5, the averaging operation is performed over symbols arriving at the coding-level estimator and detector 404 every T symbol interval in order to refine the up-scaled estimate of the input to the analog local loop for every phase of a T-symbol frame, where T is dependent upon the period of in-band robbed bit signaling (RBS). The input symbol stream is serial-to-parallel converted to T streams, with each stream consisting of symbols arrive every T symbol intervals or symbols in the same phase of a T-symbol frame. The averaging devices 408 then perform the following operation:

$$Y_l = \frac{1}{K} \sum_{k=0}^{K-1} y_{Tk+l} \quad (9)$$

Where $y_j$ is the j-th equalizer output symbol given by equation (8) and M is the total number of symbols used to get the estimate $Y_1$ for the l-th phase. As may be appreciated, $y_j$ is a Gaussian variable with the noise variance ($\sigma^2$) and $Y_1$ is also a Gaussian variable with noise variance ($\sigma^2$). However, the noise variance of $Y_1$ (i.e., $\sigma^2/M$) is smaller than that of $y_j$. Therefore, $Y_1$ provides a better estimate that the equalizer output ($y_j$). The coding-level estimator and detector 404 produces T relatively precise estimates for about all T phases, which assists in avoiding the effect introduced by robbed bit signaling (RBS).

Referring to FIG. 4, the refined estimates 408 of the coding-level estimator and detectors 404 are downscaled with reference scales 412 generated by a reference scale generator 416. The reference scales 412 are produced by the reference scale generator 416 using a training order (TO) octet of the adaptive DIL sequence 140 as the reference octet ($OCT_{ref}$) and the corresponding refined estimate 308 ($\vec{Y}_{ref}^{(T)}$). In total, S reference scales ($\vec{G}^{(S)} = \{g_0, g_1, \ldots, g_{S-1}\}$) 412 are recursively generated as follows:

$$k = 0: g_j = PCM\_LVL(OCTET_{ref} - j)/Y_{ref,0}; \quad (10)$$

$$g_i = \frac{k-1}{k} g_j + \frac{1}{k} \theta_l, \text{ where } l \text{ is such that } \theta_1 = \min(\theta_i, 0 \le i < S).$$

Each of the quantization error generators 420 receives the reference scale 412 ($\vec{G}^{(S)}$) and the refined estimates 408 in order to calculate squared quantization error sums 424. The quantization error sums 424 for each of the reference scales 412 may be expressed as a S-dimensional error vector ($\vec{E}_i^{(M)} = (E_{i,0}, E_{i,1}, \ldots, E_{i,M-1})$) with each component ($E_{i,j}$) of the S-dimensional error vector determined by:

$$E_{i,j} = \sum_{k=0}^{T-1} [g_j Y_{i,k} - PCM\_DAQ(g_j Y_{i,k})]^2 \quad (11)$$

Where PCM_DAQ(x) performs the D-to-A quantizing function in the line card associated with the analog loop conversion of an analog level to the closest coding level of a particular coding scheme, such as an A-law coding level in an A-law coding scheme. The error vectors ($\vec{E}_{ref}^{(S)}, \vec{E}_0^{(S)}, \ldots,$ and, $\vec{E}_{N-1}^{(S)}$) 424 for each of the selected octets are directly presented to an accumulator 428, except for the error vector of the feature octet ($\vec{E}_f^{(S)}$), which is conditionally provided to the accumulator 428 by a feature octet switch 440. The feature octet switch 440 conditionally provides the error vector of the feature octet to the accumulator 428 based upon a control signal ($CSG_A$) that indicates whether the refined estimate of the network CODEC output has a reasonable low noise variance, as subsequently described with reference to FIG. 6. If the refined estimate of the network CODEC output has a reasonable low noise variance, the feature octet switch 440 couples the error of the feature octet to the accumulator 428, otherwise the accumulator 428 does not receive this error vector of the feature octet for use in the production of error terms.

The accumulator 428 produces S error terms ($E_0, E_1, \ldots, E_j, \ldots,$ and $E_{S-1}$) corresponding to the S reference scales according to:

$$E_j = E_{ref,j} + E_{f,j} * (1 - CSG_A) + \sum_{n=0}^{N-1} E_{n,j} \text{ where } j = 0, 1, \ldots M - 1 \quad (12)$$

The S error terms are presented to a scale selector 432 for comparison and selection of the minimum error of the S error terms. The scale selector 432 produces a preliminary scale ($g_m'$), which represents the minimum error. The preliminary scale is also mapped to a preliminary digital loss value ($DL_m'$) by a scale-to-loss mapper 436.

The preliminary scale and the preliminary detected digital loss may require modification if a determination is made that digital loss ambiguities are not adequately resolved with the observation of the feature octet. Therefore, a scale modification switch 442 and a digital loss modification switch 444 are provided with a second control signal ($CSG_B$) that indicates the adequacy of resolving digital loss ambiguities with the observation of the feature octet. Furthermore, as will be subsequently discussed with reference to the control signal generator of FIG. 6, this adequacy is preferably related to channel non-linearity factors and power constraints enforced by the CODEC. In the event that a determination is made that the digital loss ambiguities are not adequately resolved with the observation of the feature octet, the preliminary scale and preliminary detected digital loss signal are modified with a multiplier 448 and adder 452 as follows to produce the best scale ($g_m$) and detected loss ($DL_m$):

$$g_m = g'_m * 10^{(-Amb\_d/20)} \quad (13)$$

$$DL_m = DL'_m + Amb\_d \quad (14)$$

Otherwise, the preliminary scale and preliminary detected digital loss signal are not modified and subsequently utilized as the best scale and detected loss.

Figure 6:
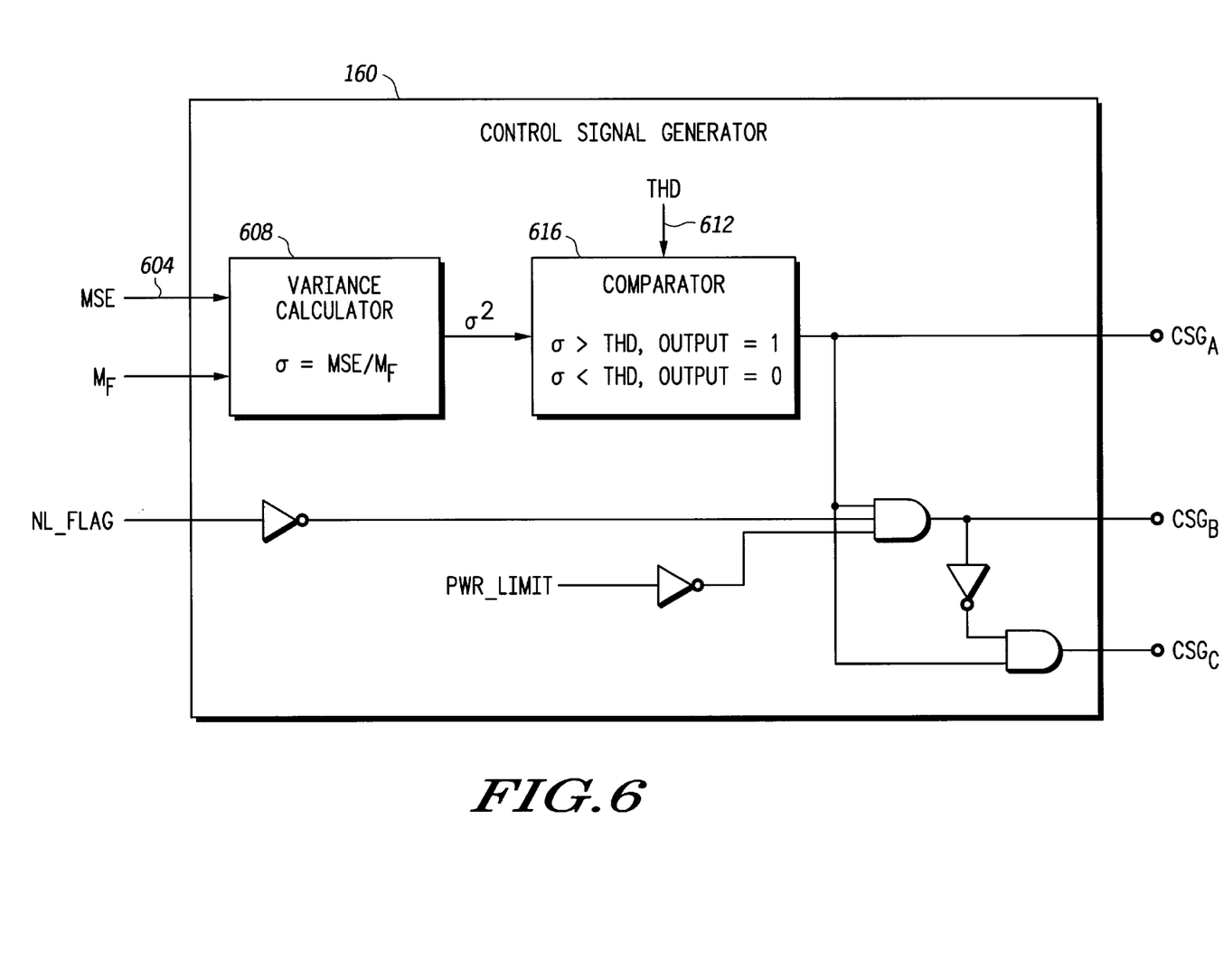
FIG. 6 is the control signal generator of FIG. 1 according to a preferred exemplary embodiment of the present invention.

Referring to FIG. 6, the control signal generator 160 receives multiple inputs in order to generate three control signals ($CSG_A$, $CSG_B$ and $CSG_C$) including the Mean Squared Residual Error (MSE) 604 reflecting the performance of the receiver equalizer. As may be appreciated, the MSE of a well-trained receiver equalizer generally provides greater accuracy than the noise variance ($\sigma^2$) obtained during an analog-probing phase. Therefore, the MSE 604 is preferably provided to a variance calculator 608 in addition to the number of transmit copies ($M_f$) of the feature octet for each of the T phases contained in the adaptive DIL sequence. The variance calculator 608 calculates the noise variance ($\sigma^2$) according to:

$$\sigma^2 = MSE/M_f \quad (15)$$

This noise variance ($\sigma^2$) represents the variance of a refined estimate ($Y_{f,j}$) contained in the estimated vector ($\vec{Y}_f^{(T)}$) at the output of the coding-level estimator and detector 304 of FIG. 3.

The noise variance calculated by the variance calculator 608 is compared with a noise threshold (THD) 612 in a comparator 614 to determine the reliability of feature octet detection by the digital loss detector 152 of FIG. 4. The noise threshold can be determined using the minimum distance ($d_{min}$) associated with the feature octet and a desired maximum error performance of the detector of FIG. 5 when used to detect the coding level associated with the feature octet. Recalling equations (6) and (7), in order to satisfy an error performance ($P_e$) that is less than or equal to 0.001, the noise threshold can be related to the minimum distance by:

$$THD = d_{min}^2/43.34 \quad (16)$$

For example, a THD of $2^2/43.34$ is desirable with the UCODE 31 feature octet for resolution of ambiguity between the (x)-dB and (x+6.02)-dB digital loss pair in an A-law network. If the noise variance is greater than the noise threshold, the detection of the feature octet is considered to be unreliable. In this situation, the first control signal ($CSG_A$) is produced that indicates that the error vector corresponding to the observation of the feature octet should not be utilized in determining the digital loss (e.g., $CSG_A = 1$). However, once a determination is made that the observation of the feature octet should not be utilized in determining the digital loss, alternate measures are preferably initiated in order to resolve the digital loss ambiguities (e.g., ambiguity between (x) dB and (x+6.02) dB with the A-law coding scheme).

The control signal generator 160 generates the second control signal ($CSG_B$ hen alternate measures are to be taken by the digital loss detector of FIG. 4 in resolving digital loss ambiguities. The second control signal directs the digital loss detector to use alternate measures in resolving digital loss ambiguity if three conditions are met. First, the comparator 616 has determined that the error vector corresponding to the observation of the feature octet should not be utilized in determining the digital loss. Secondly, the non-linear detector 156 of FIG. 7 has not found non-linearity (i.e., NL_FLAG=0), and the power constraints applied to the CODEC output in the central office is relaxed or removed from the end user modem operation conditions.

Government agencies (e.g., the Federal Communications Commission (FCC)) regulate the nominal transmit power level at the CODEC (e.g., FCC regulations provide that the CODEC output cannot exceed −10 or −12 dBm). However, this constraint has been relaxed and in some instances removed by the regulatory body. Therefore, a power limit indicator (PWR_LIMIT) is provided to indicate the absence or presence of a power constraint. In this exemplary embodiment, the power limit indicator is set to a binary "1" or "0", indicating the presence of a power constraint or the absence of a power constraint, respectively. The power limit indicator is provided as the absence or presence of a power constraint impacts the selection of alternate measures for ambiguity resolution.

Once a determination has been made that alternate measures are preferred for ambiguity resolution (e.g., selection of the (x)-dB digital loss or the (x+Amb_d)-dB digital), it is preferable to consistently select one of the losses of the digital loss pair. For example, it is preferable to select the (x+Amb_d)-dB digital loss because a constellation designed to compensate for a (x+Amb_d)-dB digital loss is difficult to corrupt even though the actual digital loss is the x-dB loss. However, if the constellation is designed to compensate for the (x+Amb_d) digital loss while the actual digital loss is the x-dB digital loss, non-linearity (i.e., harmonic distortion in the network CODEC), that is proportional to the transmit power, will degrade performance as the transmit power will be stronger than designed by Amb_d dB. In addition, the increased power with the (x+Amb_d) digital loss compensation may undesirably exceed the aforementioned power constraint.

The third control signal ($CSG_C$) is produced by the control signal generator 160 based upon the conditions specified by the first control signal $CSG_A$ and second control signal ($CSG_B$). More specifically, the third control signal provides an indication that an observation of the feature octet is unavailable due to noise considerations, a feature octet is not present in the adaptive DIL sequence, excessive non-linearity exists, or power constraints are enforced at the CODEC. The logic expression for the third control signal ($CSG_c$) can be represented as:

$$CSG_c = CSG_A.AND.\overline{CSG_B} = CSGA.AND.(NL\_FLG.OR.PWR\_LIMIT) \qquad (17)$$

Figure 7:
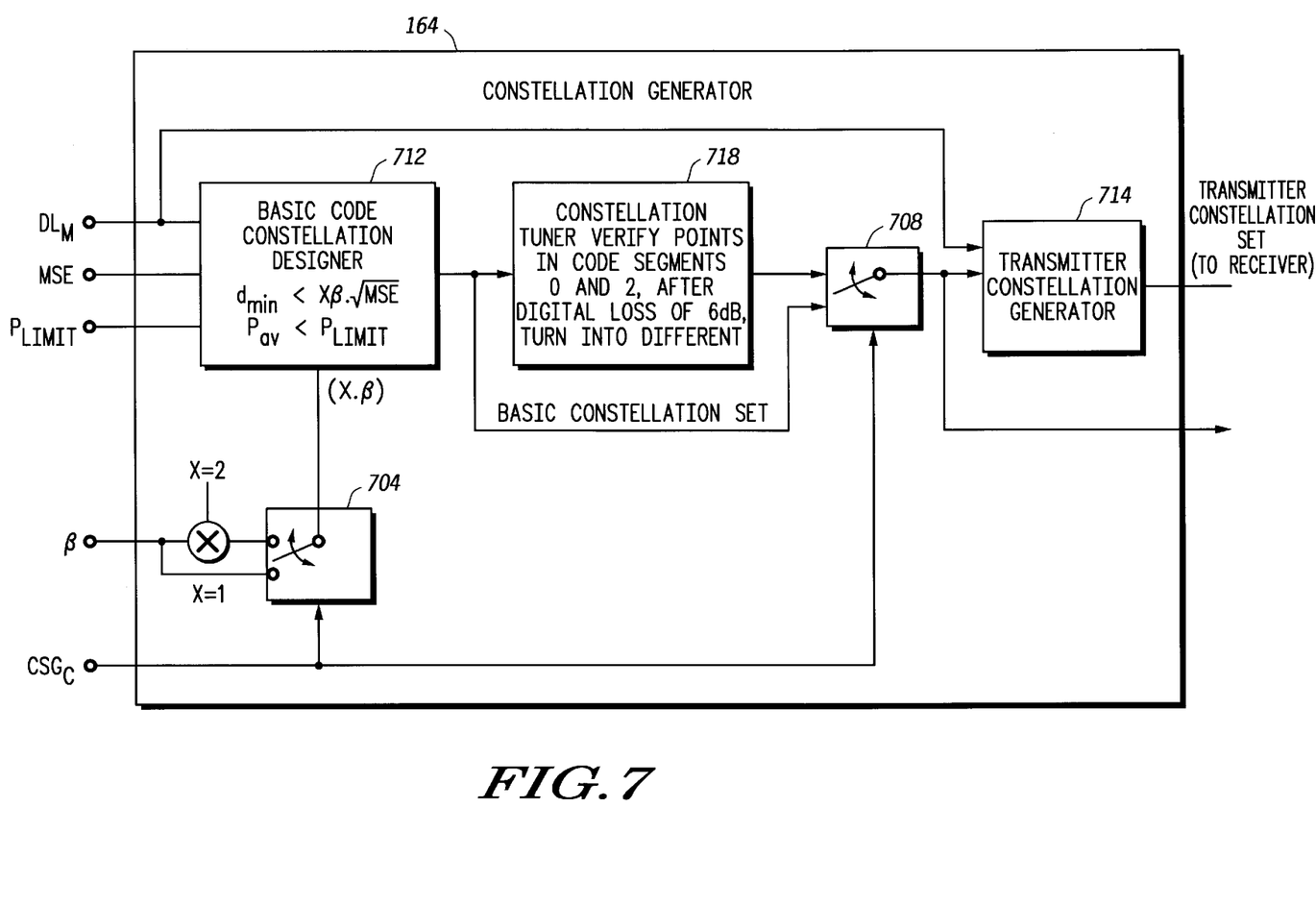
FIG. 7 is the constellation generator of FIG. 1 according to a preferred exemplary embodiment of the present invention.

Therefore, if the conditions specified by the logic expression are true (i.e., a logical "1"), the third control signal provides a directive to constellation generator of FIG. 7 to modify the constellation design in order to compensate for the digital loss of the digital loss pair that is not selected as the digital loss output.

Referring to FIG. 7, the constellation generator 164 of FIG. 1 is shown in greater detail. The constellation generator 164 receives the third control signal ($CSG_C$) and selects one of two constellation design processes based upon this signal. More specifically, if the third control signal is received that indicates that none of the previously described conditions are met (i.e., an observation of the feature octet is available, a feature octet is present in the adaptive DIL sequence, excessive non-linearity does not exist, and power constraints are not enforced at the CODEC), a first design process is selected for constellation generation.

The first design process and second design process are selected by configuring a first configuration switch 704 and a second configuration switch 708. The basic CODEC constellation designer 712 predominantly conducts the first design process, and preferably generates a basic CODEC constellation set with a minimum distance between constellation points satisfying the following relationship:

$$d_{min} \geq \beta \sqrt{MSE} \qquad (18)$$

Where $\beta$ is the tolerance-scaling factor. In addition, the basic CODEC constellation set is generated such that the average power of the constellation set is no greater than a predetermined limit (i.e., $P_{LIMIT}$, i.e., $P_{av} <= P_{LIMIT}$). Once the basic CODEC constellation set is generated that meets these two parameters, a transmitter constellation generator 714 is configured to generate a TRANSMITTER constellation set from the basic CODEC constellation and the digital loss ($DL_m$). In the first design process, a desired CODEC constellation set is produced from the basic constellation set without modification. This CODEC constellation set is sent to the receiver of the end user modem, which constructs a threshold table for the detector with the set. The central site modem is also provided with the TRANSMITTER constellation set in order to compensate for the digital loss incurred in the digital network and with the CODEC constellation set to achieve an improved far-end echo cancellation performance in favor of its own reception.

In the event that the third control signal indicates that non-linearity is present, power constraints are in force, or a reliable observation of the feature octet is unavailable, the first configuration switch 604 and a second configuration switch 608 are configured to configure the constellation generator. 164 for the second design process. The second design process includes a scaling of the tolerance-scaling factor ($\beta$) in order to limit the constellation design. Once $\beta$ has been appropriately scaled, the basic CODEC constellation set is generated in order to meet the relationship specified by equation (15) and the average power limit (i.e., $P_{av} <= P_{LIMIT}$). This basic CODEC constellation is subsequently refined by a constellation tuner 718 so that substantially all the points in the basic CODEC constellation have a one-to-one mapping correspondence to substantially all points in another constellation set which results applying a digital loss function (DL_FUN(loss,y)) assuming the predetermined ambiguity offset (Amb_d) is the digital loss value. For example, assuming that the basic CODEC constellation set is expressed as:

$$OLD\_CNSTL[Q] = (c_1, c_2, \ldots, c_j, \ldots, c_Q) \qquad (19)$$

Where Q is the number of points in the basic CODEC constellation set, $c_k$ is the UCODE of that point and $c_1 < c_2 < \ldots < c_Q$. The refined constellation having P points selected from the basic CODE constellation set, where P<=Q, may be expressed as:

$$NEW\_CNSTL[P] = (c_1, c_{k2}, c_{k3}, \ldots, c_{kp}) \qquad (20)$$

with octets ($c_1, c_{k2}, c_{k3}, \ldots$, and, $c_{kp}$) satisfy the following:

$$DL\_FUN(Amb\_d, c_1) \neq DL\_FUN(Amb\_d, c_{k2}) \neq DL\_FUN(Amb\_d, c_{k3}) \neq \qquad (21)$$

$$\neq DL\_FUN(Amb\_d, c_{kp})$$

Where the predetermined ambiguity offset is assumed to be the digital loss for the digital loss function (DL_FUN). As a result, other P and Q points ($\{c_2, \ldots, c_{k2-1}, c_{k2+1}, \ldots, c_{kp-1}, c_{kp+1}, \ldots, c_Q\}$) are removed from the basic constellation. The P and Q points, which are removed, satisfy the following:

$$DL\_FUN(Amb\_d, c_1) = DL\_FUN(Amb\_d, c_2) = \ldots = DL\_FUN(Amb\_d, c_{k2-1}), \qquad (22)$$

$$DL\_FUN(Amb\_d, c_{k2}) = DL\_FUN(Amb\_d, c_{k2+1}) = \ldots = DL\_FUN(Amb\_d, c_{k31}), \ldots, \text{ and}$$

$$DL\_FUN(Amb\_d, c_{kp}) = DL\_FUN(Amb\_d, c_{kp+1}) = \ldots = DL\_FUN(Amb\_d, c_Q).$$

Given an ambiguity offset of 6.02 dB and an A-law coding scheme in this example, a basic search is easily implemented for the refined constellation in that only points belonging to the zero code segment (code segment (0)) and the first code segment (code segment (1)) are corruptible with the digital loss of 6.02 dB.

After the constellation tuner 718 refines the basic CODEC constellation, the refined constellation set is sent to the receiver of the end user modem as a desired CODEC constellation set, which constructs a threshold table for the detector with the refined set. The transmitter constellation generator 714 generates the TRANSMITTER constellation set with the pre-selected digital loss. The central site modem is then provided with the TRANSMITTER constellation set resulting from the refined constellation set and the refined constellation set in order to compensate for the digital loss incurred in the digital network. As should be appreciated from this description of the constellation generator 164, the constellation tuning device 718 and scaling device 704 provide compensation assistance for the potential ambiguity existing in the digital loss detection. In other words, even if the detected digital loss is $DL_m$ bB wherein the actual digital loss in the network is ($DL_m$+Amb_d) dB, the designed constellation is adequate to tolerate additive noise and substantially uncorrupted by the real digital loss although a fair amount of quantization noise may exist for some points (e.g., points from the zero code segment (i.e., code segment (0) and the first code segment (code segment (1)) in an A-law coding scheme given the ambiguity offset 6.02 dB).

Figure 8:
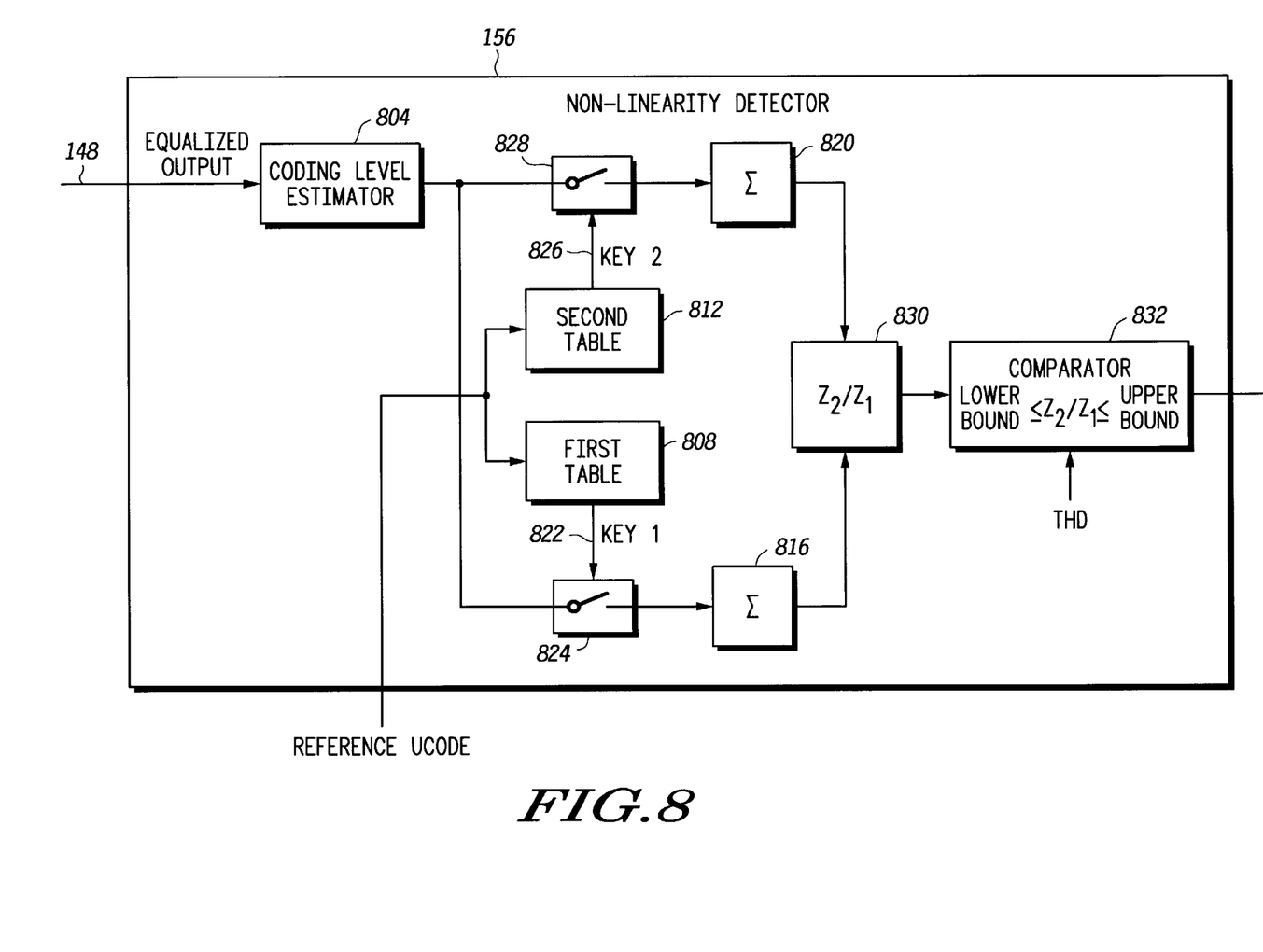
FIG. 8 is the non-linear detector of FIG. 1 according to a preferred exemplary embodiment of the present invention.

Referring to FIG. 8, the non-linear detector of FIG. 1 is shown in greater detail that is configured to detect non-linearity in the equalized output 148 of the receiver. While numerous methods and apparatus are available for detecting non-linearity, including, but not limited to methods and apparatus that use analog line probing, the preferred method of non-linearity detection uses a DIL sequence design that contains octets other than the feature octets as an ambiguity set with the ambiguity offset (Amb_d). These non-feature octets are selected and grouped into a first table 808 and second table 812 such that if the first table 808 includes a first non-feature octet (x), then the second table 812 includes a non-feature octet having a corresponding coding level that is $\gamma$ times the corresponding coding level to the first non-feature octet (x), where $\gamma=10^{(Amb\_d/20)}$. Conversely, if the second table 812 includes a second non-feature octet (y), then the first table 808 includes a non-feature octet having a corresponding coding level that is equal to the corresponding coding level of the second non-feature divided by $\gamma$. In addition, the coding levels for the non-feature octets in the second table 812 are preferably in or close to a code segment that ensures a transmit power of those points that is close to the regulated nominal transmit power. For example, in an A-law coding scheme, the fourth code segment (code segment (4)) provides a transmit power of points that are close to the regulated nominal transmit power.

The non-feature octets of the first table 804 and the second table 812 form the basis for non-linearity detection by the non-linear detector 156. When the ratio between a first sum of scaled estimated coding levels corresponding to non-feature octets of the first table ($Z_1$) and a second sum of scaled estimated coding levels corresponding to non-feature octets of the second table ($Z_2$) is substantially close in value to y, non-linearity does not exist, as the estimates for the points from the first table 804 would be subject to greater distortion due to their larger amplitude levels.

In order to perform the ratio comparison, the non-linear detector 148 utilizes a coding level estimator 804 to produce up-scaled coding-level estimates for every phase of a period T. For example, the coding level estimator 504 of FIG. 5 may be used for such purposes. These estimates produced by the coding level estimator 804 correspond to a UCODE generated by a synchronized DIL reference generator, which is operated during the DIL process, and is synchronized such that its generated octet is the source octet corresponding to the current coding-level estimator outputs. With a UCODE synchronously generated by the DIL reference generator, the coding-level estimates provided by the coding level estimator are selectively presented to a first accumulator 816 and second accumulator 820 by a first accumulation switch 824 and second accumulation switch 820 controlled by a first KEY signal (KEY 1) 822 generated by a first KEY signal generator (not shown) associated with the first table 824 and a second KEY (KEY 2) signal 826 generated by a second KEY signal generator (not shown) associated with the second table 828.

More specifically, if a reference UCODE is found in the first table 808, the first KEY signal (KEY1) is activated to close the first table switch 824, coupling the output of the coding level estimator 804 to first accumulator 816. Furthermore, if a reference UCODE is found in the second table 812, the second key signal (KEY2) is activated to close the second table switch 828, coupling the output of the coding level estimator 804 to second accumulator 816. The reference UCODEs accumulated in the first accumulator 816 and second accumulator 816 are presented to a ratio calculator 830 that determines a ratio of the values accumulated from the first table 808 to the values accumulated from the second table 812 (i.e., $Z_2/Z_1$). This ratio is compared by a comparator 832, which determines if the ratio is within a range based upon the predetermined threshold. More specifically, the following determination is:

$$\gamma - THD_{NL} \leq Z_2/Z_1 \leq \gamma + THD_{NL} \tag{23}$$

If the ratio is found to be outside the upper and lower bounds, non-linearity is found to exist and the comparator 832 generates a signal indicating such non-linearity (e.g., NL_FLG=1), otherwise a signal is generated that indicates an absence of non-linearity (e.g., NL_FLG=0). With an A-law coding scheme, two exemplary tables for the first table 808 and second table 812 are as follows for an A-law coding scheme with ambiguous digital losses for an ambiguity offset (Amb_d) of 6.02:

TABLE4={64,65,78,79}

TABLE5={81,82,94,95}

Figure 9:
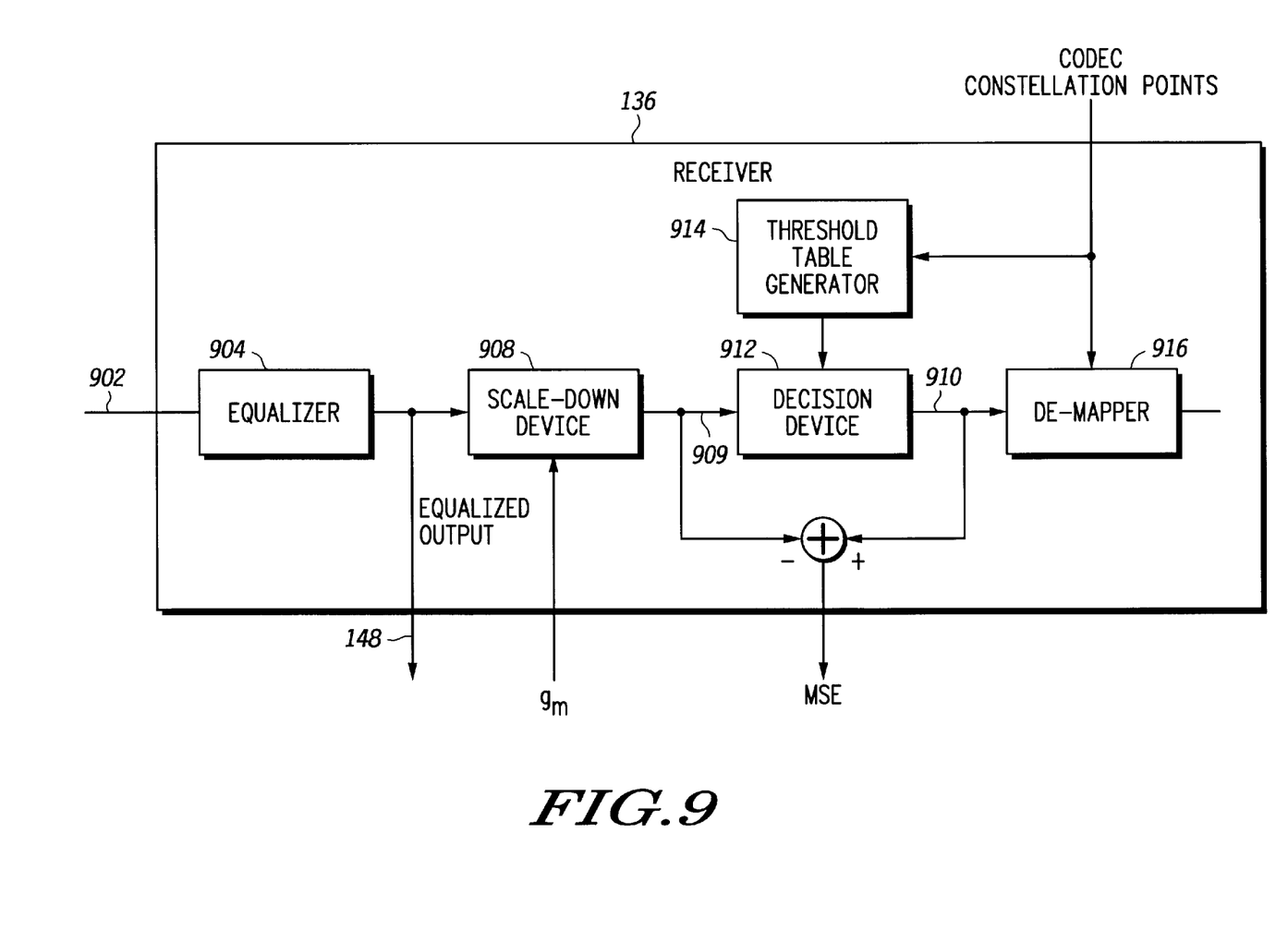
FIG. 9 is the receiver of FIG. 1 according to a preferred exemplary embodiment of the present invention.

Referring to FIG. 9, invention related components of the receiver 136 of FIG. 1 are illustrated in greater detail. Assuming the receiver clock is synchronized to the network clock, analog input signal 902 from the analog loop is provided to an equalizer 904 after echo cancellation. As previously indicated, the equalized output 148 of the equalizer 904 is provided to the digital loss detector and the non-linearity detector. Furthermore, the equalized output 148 is downscaled with a scale-down device 908 utilizing the optimum scale ($g_m$) found by digital loss detector. Therefore, the output of the scale-down device 908 substantially matches the output of the line card output in the local exchange. The decision device 912 uses the output of the scale-down device 908 and a threshold table 914 produced by the threshold table generator using the CODEC constellation generated by the constellation generator of FIG. 7. The threshold table 914 generated with the CODEC constellation is provided to the demapper 916, which produces an appropriate data stream. The residual error of the equalizer (i.e., MSE) is also calculated with information from the threshold table 914 by subtracting the input 909 to decision device 912 from the output 910 of the decision device 912.

From the foregoing description, it should be appreciated that methods and apparatus are presented for detection and compensation of impairments introduced by the digital network and analog loop of a communications network. While an exemplary embodiment has been presented in the foregoing description, it should be appreciated that a vast number of variations in the embodiments exist. Lastly, it should be appreciated that this embodiment is a preferred exemplary embodiments only, and are not intended to limit the scope, applicability, or configuration of the invention in any way. Rather, the foregoing detailed description provides those skilled in the art with a convenient road map for implementing a preferred exemplary embodiment of the invention. It being understood that various changes may be made in the function and arrangement of elements described in the exemplary preferred embodiment without departing from the spirit and scope of the invention as set forth in the appended claims.

APPENDIX A

TABLE I

STANDARD DIL DESCRIPTOR

N=150;      L$_{SP}$=96;      L$_{TP}$=1;
Ref$_c$={78,78,78,78,78,78,78,78};      H$_c$={112,64,32,16,16,16,16,16};
SP={0x8d, 0x41, 0x72, 0xbe, 0x72, 0x8d, 0x41, 0x8d, 0xbe, 0x72, 0xbe, 0x41}
TO = {<u>78, 78, 78, 78, 78, 78, 78, 78,</u> 75, 65, 35, 35, 34, 34, 64, 76, 79, 80, 86, 94, 96, 98, 100, 102, 103, 101, 99, 97, 95, 87, 81, 77, 65, 35, 35, 34, 34, 64, 74, 75, 65, 35, 35, 34, 34, 64, 76, 79, 80, 86, 94, 96, 98, 100, 102, 103, 101, 99, 97, 95, 87, 81, 77, 65, 35, 35, 34, 34, 64, 74, 73, 69, 63, 59, 55, 51, 47, 43, 39, 33, 29, 25, 21, 17, 11, 3, 5, 13, 18, 22, 26, 30, 36, 40, 44, 48, 52, 56, 60, 66, 70, 82, 84, 88, 90, 92, 104, 106, 108, 110, 111, 109, 107, 105, 93, 91, 89, 85, 83, 71, 67, 61, 57, 53, 49, 45, 41, 37, 31, 27, 23, 19, 15, 9, 1, 7, 16, 20, 24, 28, 32, 38, 42, 46, 50, 54, 58, 62, 68, 72}

TABLE 2

ADAPTIVE DIL SEQUENCE OF TABLE 1

N=158;      L$_{SP}$=96      L$_{TP}$=1;
Ref$_c$={78,78,78,78,78,78,78,78};      H$_c$={112,64,32,16,16,16,16,16};
SP={0x8d, 0x41, 0x72, 0xbe, 0x72, 0x8d, 0x41, 0x8d, 0xbe, 0x72, 0xbe, 0x41}
TO = {<u>78, 78, 78, 78, 78, 78, 78, 78,</u> 75, 65, 35, 35, 31, 31, 34, 34, 64, 76, 79, 80, 86, 94, 96, 98, 100, 102, 103, 101, 99, 97, 95, 87, 81, 77, 65, 35, 35, 31, 31, 34, 34, 64, 74, 75, 65, 35, 35, 31, 31, 34, 34, 64, 76, 79, 80, 86, 94, 96, 98, 100, 102, 103, 101, 99, 97, 95, 87, 81, 77, 65, 35, 35, 31, 31, 34, 34, 64, 74, 73, 69, 63, 59, 55, 51, 47, 43, 39, 33, 29, 25, 21, 17, 11, 3, 5, 13, 18, 22, 26, 30, 36, 40, 44, 48, 52, 56, 60, 66, 70, 82, 84, 88, 90, 92, 104, 106, 108, 110, 111, 109, 107, 105, 93, 91, 89, 85, 83, 71, 67, 61, 57, 53, 49, 45, 41, 37, 31, 27, 23, 19, 15, 9, 1, 7, 16, 20, 24, 28, 32, 38, 42, 46, 50, 54, 58, 62, 68, 72}

There are 3072 copies for point 31 in the exemplary adaptive DIL sequence, which is sufficient to provide a reliable detection for a SNR that is no less than 37 dB in an A-law network.

What is claimed is:

1. A method of generating an adaptive Digital Impairment Learning (DIL) sequence for use in a training mode, which assists in resolving digital loss ambiguities affecting mapping of analog levels to digital levels in a communications network, comprising:
   identifying a feature octet for a pair of the digital loss ambiguities using a priori-knowledge of the digital loss ambiguities;
   determining a number of transmit copies of said feature octet based at least in part upon a noise variance; and
   modifying a standard DIL sequence with said number of transmit copies of said feature octet to produce the adaptive DIL sequence for use in the training mode, which assists in resolving the digital loss ambiguities effecting mapping of the analog levels to the digital levels in the communications network.

2. The method of claim 1, further comprising obtaining said noise variance during an analog line-probing phase.

3. The method of claim 1, further comprising:
   identifying a minimum distance between the digital levels; and
   determining said number of transmit copies of said feature octet based at least in part upon said noise variance and said minimum distance.

4. The method of claim 3, further comprising:
   selecting an error performance; and
   determining said number of transmit copies of said feature octet based at least in part upon said noise variance, said minimum distance and said error performance.

5. The method of claim 4, wherein said number of transmit copies (M$_f$) of said feature octet is selected based at least in part upon the inequality of:

$$Pe \leq 2 * Q\left(\frac{d_{min}\sqrt{Mf}}{2\sigma}\right)$$

where $^{Pe}$ is said error performance, Q(x) is a Gaussian error function, d$_{min}$ is said minimum distance, and $\sigma^2$ is the noise variance.

6. The method of claim 1, wherein the adaptive DIL sequence is used in the training mode to resolve the digital loss ambiguities of an A-law coding scheme.

7. The method of claim 6, wherein said feature octet is the thirty-first octet from a second code segment (UCODE 31).

8. An apparatus for generating an adaptive Digital Impairment Learning (DIL) sequence for use in a training mode, which assists in resolving digital loss ambiguities affecting mapping of analog levels to digital levels in a communications network, comprising:
   a feature octet locator configured to identify a feature octet for a pair of the digital loss ambiguities using a priori-knowledge of the digital loss ambiguities;
   copy logic configured to determine a number of transmit copies of said feature octet based at least in part upon a noise variance; and
   a sequence modifier configured to modify a standard DIL sequence with said number of transmit copies of said feature octet to produce the adaptive DIL sequence for use in the training mode, which assists in resolving the digital loss ambiguities affecting mapping of the analog levels to the digital levels in the communications network.

9. The apparatus of claim 8, further comprising an analog line probing analyzer configured to obtain said noise variance during an analog line-probing phase.

10. The apparatus of claim 8, further comprising a minimum distance calculator configured to determine a minimum distance between the digital levels that is utilized by said copy logic to determine said number of transmit copies of said feature octet.

11. The apparatus of claim 10, wherein said copy logic determines said number of transmit copies of said feature octet based at least in part upon said noise variance, said minimum distance and an error performance.

12. The apparatus of claim 11, wherein said number of transmit copies (M$_f$) of said feature octet is determined by said copy logic based at least in part upon the inequality of:

$$Pe \leq 2 * Q\left(\frac{d_{min}\sqrt{Mf}}{2\sigma}\right)$$

where $^{Pe}$ is said error performance, Q(x) is a Gaussian error function, d$_{min}$ is said minimum distance, and $\sigma^2$ is the noise variance.

13. The apparatus of claim 1, wherein the adaptive DIL sequence is used in the training mode to resolve the digital loss ambiguities of an A-law coding scheme.

14. The method of claim 8, wherein said feature octet identified by said feature octet locator is the thirty-first octet from the second code segment (UCODE 31).

15. An apparatus for compensating for digital losses in a communications network, comprising:

a receiver configured to receive an analog signal and generate a plurality of equalized outputs representing an estimate of an adaptive Digital Impairment Learning (DIL) sequence presented to an analog loop of the communications network;

a coding-level estimator and detector configured to receive said plurality of equalized outputs and perform an averaging operation to produce a plurality of refined estimates of said plurality of equalized outputs;

a reference scale generator configured to receive a training order octet of said adaptive DIL sequence and one of said plurality of refined estimates corresponding to said training order octet, said reference scale generator also configured to produce a reference scale using said training order octet and said one of said plurality of refined estimates corresponding to said training order octet;

a quantization error generator configured to receive said reference scale and said plurality of refined estimates and calculate a plurality of quantization error sums;

an accumulator configured to receive said quantization error sums and generate a plurality of error terms;

a scale selector configured to receive said plurality of error terms and select a minimum error term of said plurality of error terms;

a scale-to-loss mapper configured to receive said minimum error term of said plurality of error terms and map said minimum error term to a preliminary digital loss value;

a transmitter constellation generator configured to receive said preliminary digital loss value and a basic constellation, said transmitter constellation generator configured to generate a transmitter constellation set from said basic constellation set and said preliminary digital loss value and transmit said transmitter constellation set to said receiver for construction of a threshold table with said transmitter constellation set; and a central site modem configured to receive said transmitter constellation set for compensation of the digital losses in the communications network.

16. The apparatus of claim 15, further comprising an adaptive DIL sequence generator for generating said adaptive DIL sequence, said adaptive DIL sequence generator comprising:

a feature octet locator configured to identify a feature octet for a pair of digital loss ambiguities using a priori-knowledge;

copy logic configured to determine a number of transmit copies of said feature octet based at least in part upon a noise variance; and a sequence modifier configured to modify a standard DIL sequence with said number of transmit copies of said feature octet to produce the adaptive DIL sequence.

17. The apparatus of claim 16, further comprising an analog line probing analyzer configured to obtain said noise variance during an analog line-probing phase.

18. The apparatus of claim 16, further comprising a minimum distance calculator configured to determine a minimum distance between digital levels that is utilized by said copy logic to determine said number of transmit copies of said feature octet.

19. The apparatus of claim 16, wherein said copy logic determines said number of transmit copies of said feature octet based at least in part upon said noise variance, said minimum distance and an error performance.

20. The apparatus of claim 19, wherein said number of transmit copies ($M_f$) of said feature octet is determined by said copy logic based at least in part upon the inequality of:

$$Pe \leq 2 * Q\left(\frac{d_{\min}\sqrt{Mf}}{2\sigma}\right)$$

where $Pe$ is said error performance, Q(x) is a Gaussian error function, $d_{min}$ is said minimum distance, and $\sigma^2$ is the noise variance.

21. The apparatus of claim 16, wherein the adaptive DIL sequence generated by the apparatus is used in the training mode to resolve the digital loss ambiguities of an A-law coding scheme.

22. The apparatus of claim 21, wherein said feature octet identified by said feature octet locator is the thirty-first octet from the second code segment (UCODE 31).

23. A method for compensating for digital losses in a communications network, comprising:

generating a plurality of equalized outputs representing an estimate of an adaptive DIL sequence presented to an analog loop of the communications network;

averaging said plurality of equalized output to produce a plurality of refined estimates;

producing a reference scale using a training order of said adaptive DIL sequence and one of said plurality of refined estimates corresponding to said training order octet;

calculating a plurality of quantization error sums from said reference scale and said plurality of refined estimates;

accumulating said quantization error sums to generate a plurality of error terms;

selecting a minimum error term of said plurality of error terms;

mapping said minimum error term to a preliminary digital loss value; and generating a transmitter constellation set from said basic constellation set and said preliminary digital loss value;

transmitting said transmitter constellation set to a receiver for construction of a threshold table with said transmitter constellation set; and transmitting said transmitter constellation to a central site modem of the communications network for compensation of the digital losses in the communications network.

24. The method of claim 23, further comprising:

identifying a feature octet for a pair of digital loss ambiguities using a priori-knowledge of said digital loss ambiguities;

determining a number of transmit copies of said feature octet based at least in part upon a noise variance; and modifying a standard DIL sequence with said number of transmit copies of said feature octet to produce said adaptive DIL sequence.

25. The method of claim 24, further comprising obtaining said noise variance during an analog line-probing phase.

26. The method of claim 23, further comprising determining a minimum distance the digital levels and determining said number of transmit copies of said feature octet based at least in part upon said noise variance and said minimum distance.

27. The method of claim 26, further comprising selecting an error performance and determining said number of transmit copies of said feature octet based at least in part upon said noise variance, said minimum distance and said error performance.

28. The method of claim 27, wherein said number of transmit copies ($M_f$) of said feature octet is selected with the inequality of:

$$Pe \leq 2 * Q\left(\frac{d_{\min}\sqrt{Mf}}{2\sigma}\right)$$

where $Pe$ is said error performance, Q(x) is a Gaussian error function, $d_{min}$ is said minimum distance, and $\sigma^2$ is the noise variance.

29. The method of claim 23, wherein the adaptive DIL sequence is used in the training mode to resolve the digital loss ambiguities of an A-law coding scheme.

30. The method of claim 29, wherein said feature octet is the thirty-first octet from the second code segment (UCODE 31).

* * * * *

UNITED STATES PATENT AND TRADEMARK OFFICE
CERTIFICATE OF CORRECTION

PATENT NO. : 6,785,326 B1
APPLICATION NO. : 09/632890
DATED : August 7, 2000
INVENTOR(S) : Lijun Daniel Tan It is certified that error appears in the above-identified patent and that said Letters Patent is hereby corrected as shown below:

In Column 13, Line 65, Claim No. 1:

Change "effecting mapping" to --affecting mapping--

Signed and Sealed this

First Day of April, 2008

JON W. DUDAS
*Director of the United States Patent and Trademark Office*